(12) United States Patent
Dimcovski

(10) Patent No.: US 6,552,347 B1
(45) Date of Patent: Apr. 22, 2003

(54) METHOD AND DEVICE FOR RADIOGRAPHIC IMAGING USING GAMMA RAYS AND X-RAY BEAMS

(75) Inventor: Zlatimir Dimcovski, Chatelaine (CH)

(73) Assignee: Bio-Scan S.A., Meyrin (CH)

( * ) Notice: Subject to any disclaimer, the term of this patent is extended or adjusted under 35 U.S.C. 154(b) by 0 days.

(21) Appl. No.: 09/485,411

(22) PCT Filed: Aug. 11, 1997

(86) PCT No.: PCT/CH97/00295

§ 371 (c)(1),
(2), (4) Date: Feb. 8, 2000

(87) PCT Pub. No.: WO99/08130

PCT Pub. Date: Feb. 18, 1999

(51) Int. Cl.⁷ .................................................. G01T 1/22
(52) U.S. Cl. ............................ 250/363.01; 250/361 R
(58) Field of Search ..................... 250/363.01, 363.02, 250/363.03, 366, 367, 370.08, 370.09, 361 R; 378/62

(56) References Cited

U.S. PATENT DOCUMENTS

| | | | |
|---|---|---|---|
| 3,600,578 A | | 8/1971 | Porges et al. |
| 3,886,082 A | * | 5/1975 | Hyman, Jr. ............ 252/301.17 |
| 4,215,274 A | * | 7/1980 | Segall ..................... 250/361 |
| 4,851,687 A | | 7/1989 | Ettinger et al. |

FOREIGN PATENT DOCUMENTS

| | | |
|---|---|---|
| FR | 2 068 752 | 9/1971 |
| JP | 63-238586 A * | 10/1988 ............ 250/208.1 |
| SU | 416 648 | 3/1984 |

OTHER PUBLICATIONS

D.J. Fegan et al. :"Fast Large aperture camera and data acquisition system with physics and nuclear medicine" Nuclear Instruments & Methods in Physics Research., vol. 211, No. 1 Jun. 1983, Amsterdam NL, pp. 179–191, XP002063810 see p. 179, col 1, line 1–23.
International Search Report in SN PCT/CH97/00295.

* cited by examiner

Primary Examiner—Constantine Hannaher
Assistant Examiner—Albert Gagliardi
(74) Attorney, Agent, or Firm—Bugnion S.A.; John Moetteli

(57) ABSTRACT

The invention concerns a method, a sensor and a radiographic imaging system in real time for discriminating the low energy ionizing radiation, corresponding at least partially to dispersion radiation, thereby eliminating their contribution in the sensed image, so as to increase the contrast, for relatively reduced amounts of incident radiation. In the figure is presented a radiographic system more particularly designed for radiotherapy, basically consisting of an accelerator (1) emitting a collimated beam (3) of photons and in particular of X-rays towards a patient lying down (2). The patient is positioned so as to enable the best possible localization not only of the collimated gamma or X-ray beam impact but its depth as well and the localization of the portion where the major part of the dose is to be delivered. For this purpose, the installation comprises a sensor (4), located subjacent which interprets the sensed signals by means of a microcomputer (5), after interfacing, so as to provide in real time a corresponding image, which can be immediately interpreted.

20 Claims, 4 Drawing Sheets

METHOD AND DEVICE FOR RADIOGRAPHIC IMAGING USING GAMMA RAYS AND X-RAY BEAMS

The subject of this invention is a new process for detecting and analyzing the interaction of gamma and X-rays, particularly at high energies (in practice called hard X-rays) with an object or a patient (target under study further on).

It includes a detector which starts up this process, and a radiographic system, which reconstitutes in real time the detected image of an object or an X-rayed element, the incidental flux of which is made up of gamma photons or hard X-rays, thus activating the detector.

The generation of gamma rays and hard X-rays, typically with an energy of more than some 100 kiloelectronvolts (keV), is nowadays widely developed in order to study the internal structure of material objects or, in the sphere of radiotherapy, notably to treat cancers. However, the difficulty in obtaining images of quality that can be correctly interpreted is important, especially in comparison with traditional radiographical techniques using low energies.

These difficulties are not only inherent in the lower absorption coefficient of the gamma rays, they also come from the different phenomena of interaction that come into play. Indeed, when a beam of x- or gamma rays penetrates matter, there occurs a phenomenon of attenuation of energy of the incidental photons following the interaction between the photons and the matter they pass through (i.e., pass-through radiation).

This interaction can occur either with an electron of matter or with one of the nuclei of the atoms that make up this matter. One type of interaction that can be distinguished with electrons is the Compton effect, i.e. the ejection of the electron that was the object of the interaction, and the creation of a scattered photon; another is the photoelectric effect, i.e. the ejection of an orbital electron under the action of the energy transferred by the incidental photon. The photoelectric effect is dominant for energies of incidental photons of up to around 100 keV. Beyond this threshold, the photoelectronic effect diminishes in favor of the Compton effect.

The interaction with the nuclei leads to the creation of electron-positron pairs, this effect becoming dominating over the Compton effect beyond energies of the order of 5–10 MeV depending on the atomic number of the matter passed through.

The low absorption coefficient added to the fact that its value, specific for each atomic element, becomes very similar for these elements as soon as the energy of the incidental photons reaches about 1 MeV, leads to a significant reduction in contrast, limits the efficiency of the detectors of these rays integrated within the radiographic installations, and seriously limits the quality of the images that are captured.

Moreover, highly energetic electrons and high energy secondary photons interact with the experimental volume, making it necessary to use stronger barriers against these secondary effects, constituting as many sources of particles affecting the detected signal, notably its contrast and limiting the resolution in terms of position within the resulting image.

In industrial radiography, high energy X-rays are used to X-ray relatively dense objects, for example in order to carry out non-destructive testing of steel constructions, to perform tests on soldering, etc. X-ray imaging also provides information on the internal structure of the object.

This type of X-rays, situated in the same range of energy, are also used in radiotherapy for the treatment of malignant tumors. In this case, this radiation is used in order to modify the biological structure of living tissues and also to destroy them. The X-ray image of the irradiated patient helps the operator to improve the positioning of the patient and to better regulate the collimation diaphragms in order to achieve a better quality of treatment and especially to reduce the risks of lesions of healthy tissues by reducing as much as possible the dose delivered whilst checking the position.

Radiographic imaging using X-rays of such energies, i.e. higher than 500 keV, would appear to be difficult to perfect, taking into account the weak effective cross-section of the interaction of the photons with matter. In fact, images with weak contrast are generally obtained, taking into account the weak dependence of the attenuation coefficient on the photon with the atomic number, so that the regions constituted by different elements are distinguished with difficulty. In order to improve the quality of the images, it would therefore appear to be necessary to acquire a large sample of photons detected at the level of the detector. Thus, two possibilities present themselves. The first is to increase the dose of radiation administered to the object. The second is to optimize the efficiency of the detection of photons at the level of the detector.

If the first of these possibilities is entirely acceptable in the sphere of analysis of static objects, especially at the industrial level, this is certainly not the case in the context of radiotherapeutic treatment for which the dose administered is strictly controlled for obvious safety reasons.

Another important factor that reduces the quality of radiotherapeutic images when high energy photons are used is the large fraction of photons that come not from the principal source of photons, but which are secondary photons created by interactions such as the Compton effect or Bremsstrahlung, occurring as much in the matter surrounding the irradiated object, in the irradiated object itself, in the collimation elements, or even in the detector itself.

Finally, another factor contributing to the difficulty in obtaining images of good quality relates to the weak effective cross-section of the interaction of high energy photons, for which only a small fraction of the photons passing through the object to be analyzed contribute to the image.

One of the objectives of the invention is to optimize the efficiency of the detection of primary photons by the detector. To do this, it aims to selectively detect only the part of the spectrum of primary or direct photons by the use of a threshold, and thus to minimize the contribution of secondary or scattered photons to the signal.

A gamma ray or X-ray detector is placed behind the object or the patient to be treated. For industrial radiography, this detector should be able to provide an image of the internal structure of the irradiated part of the object with a maximum of precision and contrast. For radiotherapy, it must provide an image of sufficient quality with a minimum dose of radiation.

Among the best known detectors are those that use portable films made of an X-ray sensitive film sandwiched between two metallic plates. Despite a good efficiency at low energy and a good spatial resolution, this kind of system has a mediocre contrast.

Moreover, and above all, the use of these films makes it impossible to obtain images in real time or nearly real time, which is becoming more and more necessary in radiotherapy.

It therefore became necessary to develop an electronic imaging device for testing, of the type better known as "Electronic Portal Imaging Devices" (EPID), especially on-line, able to deliver an image in real time at high contrast and using a weak dose administered to the patient.

Systems were proposed such as a video system with a mirror and phosphorescent screens. This system consists of a metallic plate coated with fluorescent phosphorus, the screen being visualized by a video camera using a mirror at an angle of 45 degrees. The interaction of the X-rays with the metal plate creates high energy electrons by photoelectric effects, the Compton effect and the creation of pairs, and induces fluorescence inside the screen.

Although this type of system develops a good spatial resolution, it has only a weak contrast and a high dose is often necessary to obtain a readable image. Moreover, these systems have a tendency to age relatively rapidly, are bulky and costly in production Another device that was developed was an ionization liquid chamber. The ionization chamber consists of a matrix of wires composed of two parallel surfaces of wires, typically of 256 wires for each surface. The 256 electrodes of one orientation detect the signal, each of the electrodes being connected to a very sensitive current detector (picoamps). The other 256 electrodes work as high tension electrodes and are linked to a tension switch. Between the two surfaces is the ionisation liquid. The signal comes from ionization of the liquid in the form of electron-ion pairs and its amplitude is proportional to the energy deposited in the medium by the ionizing particles during the integration time of the read-out electronic circuit.

In fact, to obtain an image, the matrix is scanned line by line whilst switching the tension successively on each electrode.

Even though the resulting device is quite compact, and its sensitivity is relatively acceptable, there are difficulties in calibration of the matrix and the purity of the organic liquid is often difficult to obtain. Moreover and above all, the weak contrast does not make it possible to obtain images of very good quality.

Other systems have been developed using solid state technology, in particular silicon detectors. These detectors can be made of a linear array of 256 silicon diodes, placed next to a lead plate of about 1 millimeter thick, each silicon diode detecting the high energy electrons created by the X-rays that interact with the lead plate, and penetrating into the sensitive volume. The ionized charges in the depleted layer of silicon are amplified and digitalized by means of an analogue-digital converter.

Detectors of this type need in general high doses to provide contrasted images of sufficient quality and the total duration of verification of the fields is generally greater than for bi-dimensional imaging devices.

Finally, recent developments in the field of materials science and in the technology of hydrogenated amorphous silicon (a-Si:H) have made it possible to increase the pixel resolution of large photosensitive bi-dimensional detectors. An a-Si:H matrix is positioned immediately after a sandwich of a metallic plate and a phosphorescent screen, these two components fulfilling functions identical to those in systems with a fluoroscopic camera. In fact, the a-Si:H matrix serves as a substitute for the mirror, the camera with a lens, or even of a bundle of optical fibres, in classic systems. Compared with other optical systems, the advantage of using an array of photodiodes positioned near a phosphorescent screen is that a large fraction of the light emitted can be captured and converted into a signal. However, this type of system has the inconvenience of exposing the cards with very sensitive amplification electronics, which are directly integrated inside the array to intense fluxes of hard X-rays during the treatment sessions in radiotherapy, which are capable of inducing fluctuations in the signal and may cause radiation damage of the electronic channels.

The objective of the current invention is therefore to propose on the one hand a process and on the other a detector, and finally a system for radiographic imaging in real time which can discriminate low energy ionizing radiation, which consists at least in part of scattered radiation, and thus to eliminate their contribution to the detected image, so that the contrast is increased, and this can be done with relatively reduced doses of incidental radiation.

In the same way, the invention aims to improve the signal/noise ratio, and also the spatial resolution of the image thus acquired.

The process invented, and the functioning of the detector and of the system that activates it are based on the principle of the emission threshold for light of the Cherenkov type, which appears when the charged particles generated by the interaction between photons and matter pass through a specific dispersive medium.

This process to detect and analyse the interaction of the gamma and X-rays with an object consists in positioning next to this object subjected to the irradiation of incidental rays a first material capable of emitting, under the action of the radiation emerging from this object, high energy charged particles, then to interpose in the path of these particles a second material capable of emitting a Cherenkov radiation after interacting with the particles. The refraction index of the second material is selected in such a way that the Cherenkov emission could only occur for the specific energy threshold of these charged particles, i.e. the emerging rays, the Cherenkov emission being detected by means of a photon detector.

Thus, taking into account the fact that the Cherenkov emission occurs only for a specific energy threshold, it becomes possible to operate a selection by energy bands. In fact, one can eliminate the "noise" that comes for example from low energy scattered gamma rays.

The incidental gamma and X-ray detector is constituted of:
  a converter of the incidental rays into high energy electrons, created by phenomena of pair production and the Compton effect;
  a photon emitter by the Cherenkov effect under the action of high energy electrons from the converter, this emitter being attached to the converter;
  an element of detection sensitive to the photons thus created and capable of restoring spatially the emission density of the Cherenkov photons coming from the Cherenkov emitter.

It is better to interpose between the Cherenkov photon emitter and the detection element a layer of a material intended to shift the wave length of the Cherenkov photons emitted in the visible waveband.

For example, the converter is constituted of a material with a high atomic mass number, chosen from the group including tungsten, lead, copper, pure or in the form of an alloy.

The thickness of the converter is preferably in the range 0.1 to 20 millimetres in most cases.

The Cherenkov emitter has typically a refraction index of between 1 and 2. It is composed of an optically transparent material, in the form of a crystal, an amorphous solid or a liquid. It can be made, for example, of calcium fluoride, sodium fluoride, lithium fluoride, magnesium fluoride, or even of natural or synthetic silicon or of silicon aerogels. In the liquid state, it can be made of water, or even of freon.

The detection system is preferably composed of a camera with a charge coupled device (CCD) with or without an image intensifying device, or even with a cooling device for the CCD sensor. This camera is coupled optically by means of a mirror and a lens either directly to the Cherenkov emitter or to the wavelength shifter. This coupling can also be done by using a bundle of optical fibers.

The detection system can also be made of a matrix of photosensitive elements like bi-dimensional hydrogenated amorphous silicon ones.

The wave length shifter is preferably made of a layer of sodium salicylate of a thickness ranging between 10 nanometers and 500 micrometers covering the output surface of the Cherenkov emitter. It can also be selected from the group including sodium salicylate, p-terphenyl, diphenyloxazole (DPO), tetraphenylbutadiene (TPB), p-quaterphenyl (PQ), diphenylstilbene (DPS), trans-stilbene (TS), diphenylbutadine (DPB), phenylene phenyloxazole (POPOP), bis(2-methylstyryl)benzene (bis-MSB), benzimidazo-benzisoquinoline (BBQ).

A brief resume of the principle of Cherenkov emission is given hereunder:

A charged particle moving at a speed $v=\beta c$ (where $\beta$ represents the number of units of the speed of light c in a vacuum), in an optical medium with a refraction index n, emits photons called Cherenkov photons when the speed v exceeds the speed of light in the medium, i.e. when $v>c/n$, or when $\beta>1/n$.

The Cherenkov polar angle of emission in respect to the direction of the incidental particle is given by the equation : $\cos \theta = 1/N\beta$.

The majority of photons is emitted in the wavelengths close to ultraviolet.

The way in which the invention can be applied and the advantages to be derived from it can be better shown in the following example together with the illustrative figures, given as an indication and not limitation.

FIG. 3 shows schematically a transverse cross-section of a Cherenkov emitter of the first type of construction, which forms part of a detector in conformity with the invention, of which

Figure 1:
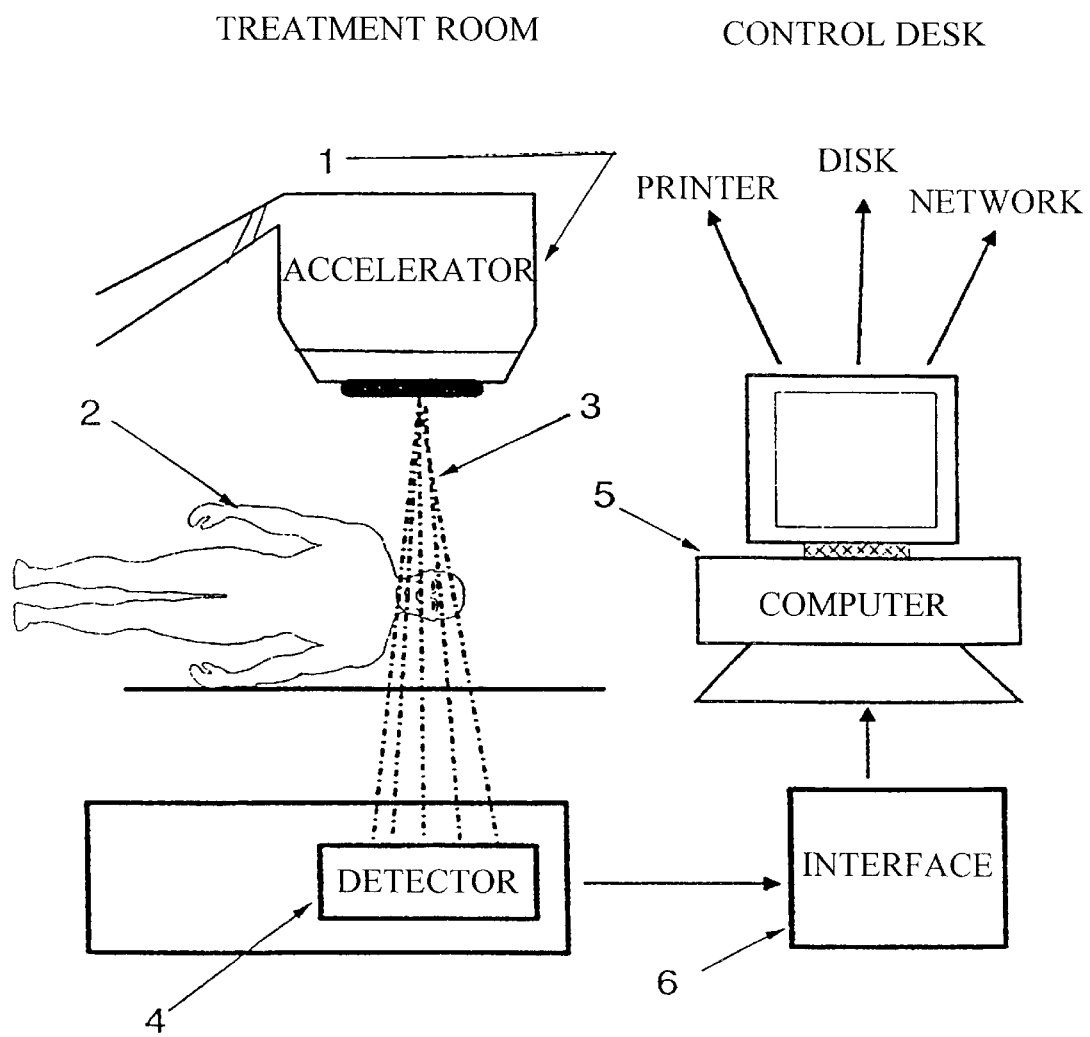
FIG. 1 shows schematically an on-line monitoring detector integrated into a radiographic real-time system in accordance with the invention.

FIG. 1 shows a radiographic system more particularly intended for radiotherapy. Basically, it consists of an accelerator (1) emitting a collimated beam (3) of photons and particularly X-rays directed onto a reclining patient (2). The patient is positioned so as to target as precisely as possible the impact of this collimated beam of X-rays, and also the depth of penetration and localization of the major delivery of the dose to be administered. To do this, the installation includes a detector (4) in conformity with the invention, situated adjacent to it, the interpretation of the signals detected being controlled by a micro-computer (5), after interfacing (6) in order to have available in real time a corresponding image, which can be interpreted immediately.

Figure 2:
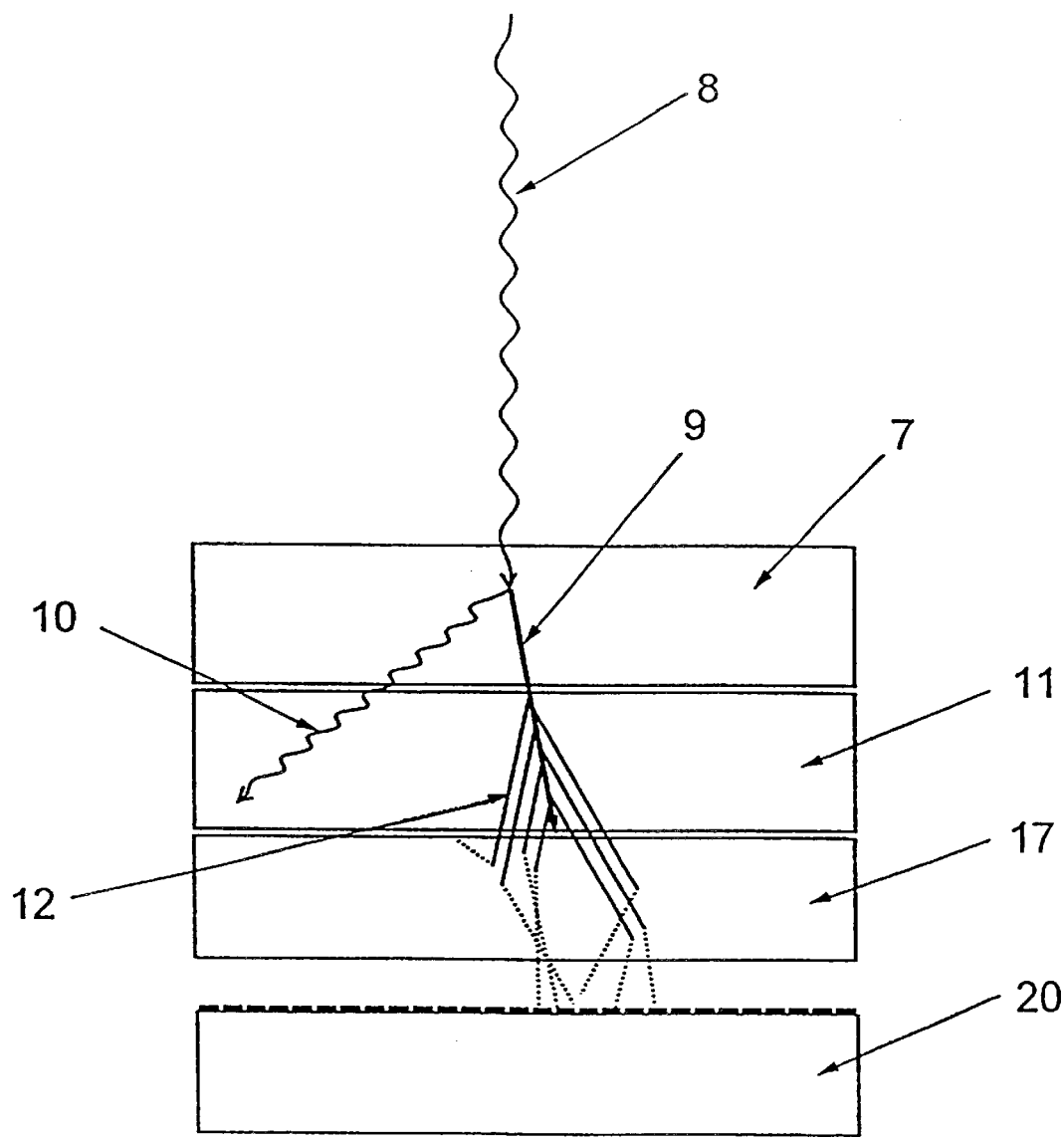
FIG. 2 shows a layout of the imaging detector in accordance with the invention.

The specific detector is described in greater detail in FIG. 2. According to the invention, this detector incorporates first of all a converter (7), typically consisting of a plate made of lead, tungsten or copper, or even an alloy based on these elements, but in any case based on elements with a high atomic mass number, so as to transform the incidental photons (8) into very high energy electrons (9), either by the Compton effect or by pair production. The emission of a secondary photon is shown (10) which appears as soon as the Compton effect comes into action.

This converter (7) is immediately followed, being attached to it, by the emitter (11) of Cherenkov photons, represented by the divergent beam (12) starting from the angle of 0 in respect to the incidental direction of the secondary energetic electrons (9), and depending on the type of particles and their energy, taking into account the refraction index of the medium activated.

This Cherenkov photon emitter (11) is made either of an amorphous solid such as calcium, sodium, lithium or magnesium fluoride, or even of quartz or silicon aerogel (n(SiO2)+2n(H2O)), or even of a liquid material, notably water or freon.

Whatever material is chosen, the material used presents a refraction index greater than 1, and for example comprised between 1 and 2. This Cherenkov emitter is transparent to light. A characteristic of the invention is that the material constituting the Cherenkov emitter cannot scintillate when it is exposed to ionizing radiation.

The structure of the Cherenkov emitter can be of different types.

Figure 4:
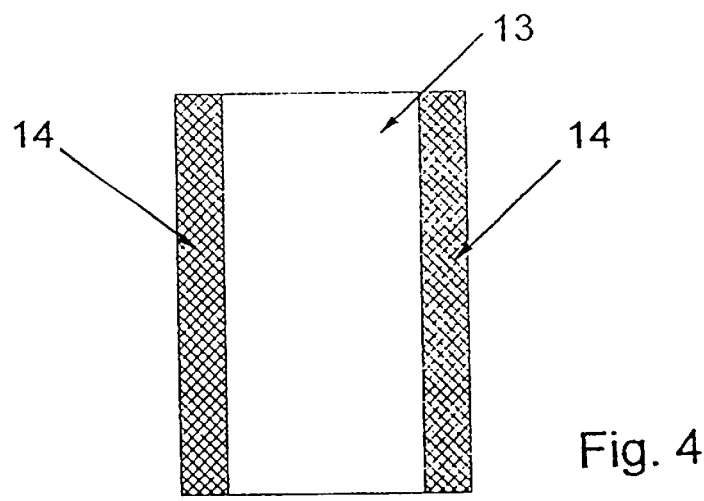
FIG. 4 shows a detailed view.
Figure 3:
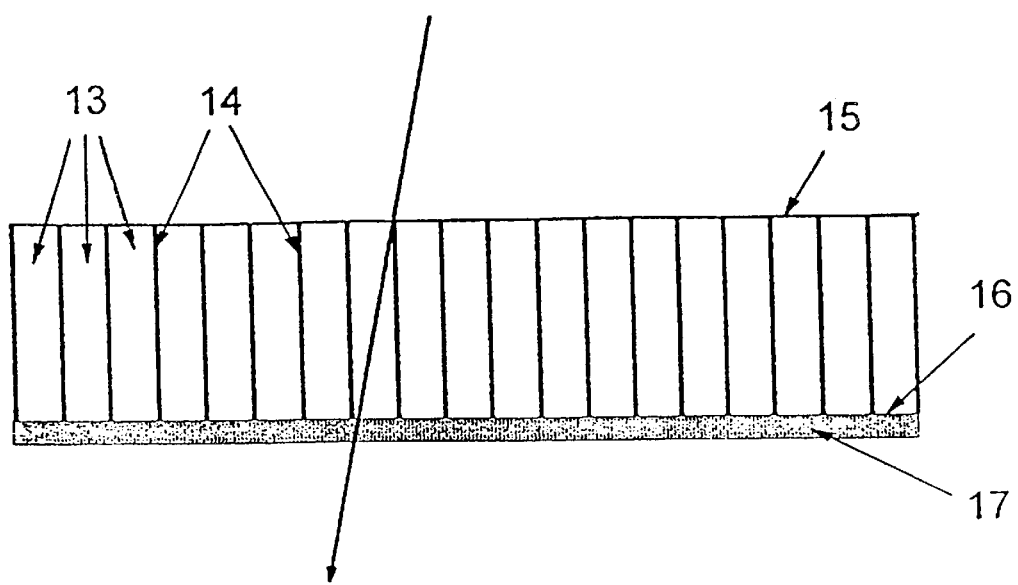

In a first form, shown in FIGS. 3 and 4, the Cherenkov emitter is made up of a bundle of parallel optical fibers (for example composed of synthetic quartz), separated optically and each one immersed in a fine layer of a heavy metal (14). This fine peripheral layer of heavy metal makes it possible to increase considerably the efficiency of detection. Although it is constituted of adjacent optical fibers, the Cherenkov emitter remains in the form of a plate, the two main faces of the plate (15, 16) composed by the extremities of these optical fibers, stuck together in order to form a rigid and uniform structure. The thickness of this plate is thus defined by the length of the optical fibers. Alternatively, the optical fibers are oriented perpendicularly to the principal incidental direction of the photons to be detected.

The Cherenkov light emitted during the passage of a particle through a fiber is trapped inside this fiber and the spot of this light at the output of the emitter corresponds to the diameter of the fiber. A particle crossing several fibers thus leaves no trace except in the fibers it passes through. In fact, in this version, the spatial resolution depends on the diameter of the fibers and on the scattering of the electrons and positrons entering the Cherenkov emitter of this construction. Therefore it is possible to obtain an intense luminous signal as output, with a weak dispersion in the volume of the emitter.

Of course, the section of optical fibers constituting the emitter can be made in any shape, circular, rectangular, square etc.

Figure 5:
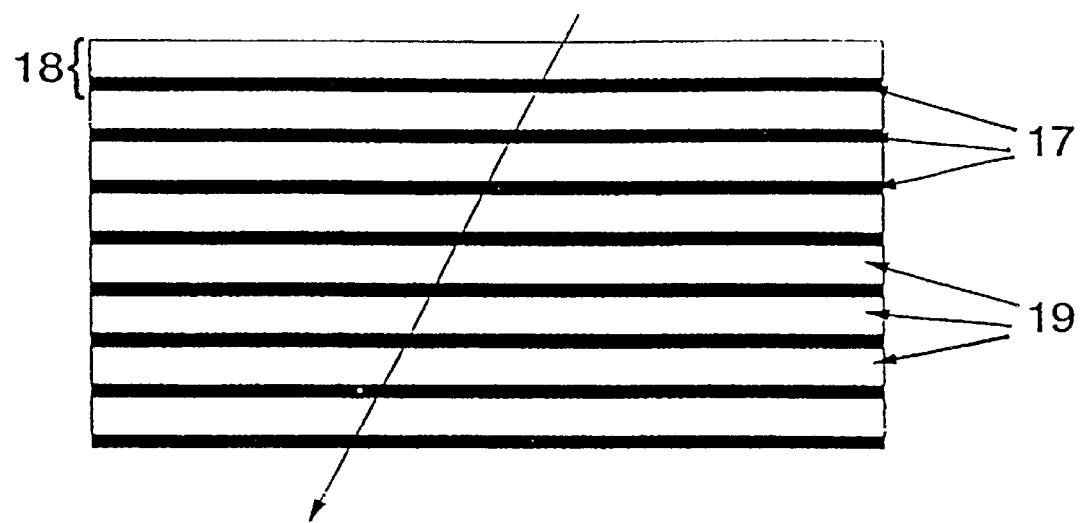
FIG. 5 is analogous to FIG. 3 and shows another form of realization of the invention.

In a second version of the invention, the Cherenkov emitter (11) could be made of simply a plate. The surface of this plate could be coated with a layer consisting of a wavelength shifter (17), as described in greater detail hereafter. This unitary structure can be replicated a certain number of times, to obtain a multi-layer emitter, as shown in FIG. 5. Each of the layers (18) consists of a plate (19) capable of emitting Cherenkov photons under the action of electrons or positrons, and can be made of synthetic quartz. Sandwiched between each plate is a wavelength shifting layer (17), with the same type of layer coating the exit surface of the stack thus constituted.

Each unit (18), i.e. each individual plate with a wavelength shifting layer, emits an independent signal, the wavelength shifter being transparent to its own fluorescence.

When a particle passes through the whole thickness of the stack constituting the Cherenkov emitter, the resulting signal is equal to the sum of the signals emitted by each of these emitting plate/shift layer units. Thus, the amplitude of the signal corresponds to the light emitted in an emitting plate of a thickness equal to the sum of the emissions from the single plates constituting the stack.

Indeed, by using a stack of several individual emitters, the size of the final spotlight is reduced, and in fact, the spatial resolution is increased.

Typically, the thickness of the Cherenkov emitter ranges between 0,1 millimeters and 20 millimeters.

The Cherenkov emission threshold is given by the refraction index of the medium. In fact one can only detect the charged particles of a given mass with an energy higher than a certain threshold. In the case of X-rays, the particles to be detected are constituted of either electrons or positrons, therefore the mass is known. By applying a threshold to the energy of the electrons and positrons, one applies a threshold to the X-rays to be detected. In this way, the detector's output is freed from all the X-rays of a lower energy which, as previously indicated, diminish the contrast of the resulting image.

As already stated, one of the characteristics of the invention is that the detector incorporates a wavelength shifter (17), coupled with the Cherenkov emitter (11). This wavelength shifter is intended to shift the wavelength of the Cherenkov photons emitted towards the visible band. Indeed, as already stated, the spectrum of Cherenkov emission is generally situated in the range of low wavelengths typically close to the ultraviolet. In order to optimise the efficiency of the detection module, at the exit point of the Cherenkov emitter a fine layer is placed consisting of a substance emitting photons in the visible range, starting from ultraviolet photons with such a substance, it is possible to obtain a conversion of the visible ultraviolet photons of nearly 100%.

This layer should preferably be made of sodium salicylate or p-terphenyl, or a mixture of organic components. It should be deposited on the exit side of the Cherenkov emitter, or on the downward facing individual layers. It is typically of a thickness ranging from 10 manometers and 500 micrometers.

The detector also includes a photosensitive device capable also of defining the point of impact (20), i.e. to restore a spatial resolution. Various alternatives are possible depending on the specificity of the radiographic measurements. A camera with a charge coupled device (CCD) could be used, possibly linked to an image intensifier. The camera is coupled with the wavelength shifter or a Cherenkov emitter, either by using a mirror and a lens, or a bundle of optical fibers.

This technique of using a CCD camera for detection is thoroughly described in the following articles:

N. A. Baily, R. A. Hom and T. D. Kampp: "Fluoroscopic visualisation of megavoltage therapeutic X-ray beams". Int. J. Radiat. Oncol. Biol. Phys. 6, 935–939 (1980).

J. W. Wong, W. R. Binns, A. Y. Cheng, L. Y. Gear, J. W. Epstein, H. Klarmann and J. A. Purdy. "On-line radiotherapy imaging with an array of fiber-optic image reducers". Int. J. Radiat. Oncol. Biol. Phys. 18, 1477–1487 (1990).

In another version of the device, the CCD camera can be replaced by a matrix of photosensitive elements, such as amorphous hydrogenated silicon presented in the form of bidimensional sensor arrays, also directly coupled with either the wavelength shifter, or with the Cherenkov emitter.

This technique of detection of luminosity has been described, inter alia, in the article: L. E. Antonuk, J. Boudry, W. Huang, D. L. McShan, E. J. Morton, J. Longo and R. A. Stree: "Demonstration of megavoltage and diagnostic X-ray imaging with hydrogenated amorphous silicon array" Med. Phys. 19(6), 1992, p.1455.

The use of this detector inside radiographic imaging devices makes it possible to obtain images in real time, presenting a much better contrast, taking into account the threshold nature of the Cherenkov effect.

For the same reason, the signal/noise ratio is also considerably improved.

In the field of radiotherapy, the detector which is the object of this invention, also makes it possible to significantly reduce the doses of radiation administered, taking into account the fact that positioning the patient is made easier, this being enhanced by the fact that the images are obtained in real time.

A succinct description is given below of the principle of operation of the installation that uses a detector, which could be a CCD camera.

As is known, the target of a beam of monoenergetic electrons emerging from the linear accelerator emits a flux of hard X-rays, with an energy spectrum corresponding to the Bremsstrahlung emitted by the heavy metals of which the target is made under the action of the electrons. The maximum energy of X-rays is very close to the energy of the electrons emitted from the accelerator. Moreover, the dimension of the volume of the source of X-rays is equal to the diameter of the beam of electrons and the thickness of the target.

The divergent beam of X-rays emitted by the target has a relatively wide energy spectrum, and reaches the object to be analyzed or the patient to be treated, placed at a certain distance from the source, usually 1 meter. Two effects are then observed: the primary X-rays are attenuated and the interaction of the primary photons with the object produces a scattered radiation. The intensity of the scattered radiation after passing through the object can be greater than that of the incidental photons for thick and heavy objects.

Low energy components of the primary radiation are greatly attenuated when they pass through the object. On the contrary, the spectrum of secondary radiation, i.e. scattered, is concentrated around low energies. In fact, two rather separate main components are observed behind the object under test or the patient under treatment: below the level about 1 MeV the quantity of scattered radiation is greater than that of the primary X-rays, and above this level primary radiation predominates.

It is the local degree of attenuation of the primary beam that provides information regarding the internal structure of the object in transmission radiology. The scattered radiation does not provide any information on the structure of the object, but contribute to the creation of images using films or luminescent screen technology. In fact, they increase the noise and affect the resolution in terms of position as well as contrast. Thus, the increase in the quality of the images is achieved by a diminution in the contribution of the scattered or secondary radiation.

The detector corresponding to the invention is positioned at a certain distance from the object to be analysed or the patient to be treated. The radiation issuing from the said object or the said patient interact with the converter, emitting Compton electrons and electron/positron pairs. The charged particles with an energy higher than the threshold defined by the refraction index of the Cherenkov emitter put next to the converter produce Cherenkov light. Taking into account the fact that the energy of the said charged particles is correlated with the energy of the incidental photons from which they originated, the definition of an energy threshold of charged particles leads to the definition of a threshold for the incidental X-rays. In practice, the energy threshold of detection of X-rays is slightly higher than that of the charged particles, especially electrons.

Thus, if an appropriate material is selected for the Cherenkov emitter, the low energy band of the radiation emitted by the object under study or the patient under treatment becomes undetectable, eliminating therefore the contribution of scattered (or secondary) radiation from the creation of images, and with practically no effect on the primary radiation.

The density distribution of photons at the level of the detection plane corresponds to the distribution of the attenuation of the latter inside the object to be analyzed or the patient to be treated. Thus, by detecting the distribution in density of the primary photons, an image can be obtained of the internal structure of this object or this patient.

In the same way, the quantity of local emission of Cherenkov light is proportional to the number of gamma photons that reach the Cherenkov emitter. Thus, the distribution of the surface density of Cherenkov light emitted by the emitter allows restoration of an image of the internal structure of the object or the patient exposed to this radiation.

This image is preserved after conversion of the Cherenkov spectrum by the wavelength shifter. The radiographic image obtained can be registered and stored by detection of the density distribution of the light emitted by the shifter. For this purpose, a photosensitive device that can indicate position is used, such as a CCD camera. This camera is coupled by means of a flat mirror and a lens to the plane constituted by the wavelength shifter. Inside the charge coupled device, the local luminous intensity is converted into electric charges for each pixel, the quantity of charges in each pixel being proportional to the quantity of light emitted at the level of the corresponding zone of the wavelength shifter, exposed in its turn to the Cherenkov light. The pixelized electronic image is afterwards stored in a memory associated with a unit of signal processing. It could be useful to equip the CCD camera with an image intensifier intended to enhance the sensitivity of the camera.

Furthermore, the matrix of the CCD camera can be cooled during information acquisition to a temperature around −100 degrees C., in order to reduce the thermal noise originating from the semiconductor components, and to improve the sensitivity and the dynamic range of detection devices.

What is claimed is:

1. A process for detecting and analyzing the interaction of gamma and X-rays with an object to be studied, such as a patient, the process using an emitter selectively emitting radiation and placed on a first side of the object, wherein the process comprises the following steps:
    placing on a second side of the object to be studied a first material which is able to emit, as a result of pass-through radiation, i.e., that which has been emitted from the emitter and passed through and interacted with the object, particles charged with high energies;
    interposing in the path of these particles a second material capable of emitting, after interaction with the particles, a Cherenkov radiation, the refraction index of this second material being selected in such a way as to allow Cherenkov emission only above a defined energy threshold of said particles and to eliminate all contribution of scattered rays;
    detecting the Cherenkov radiation and its spatial distribution;
    analyzing the detected radiation.

2. A process according to claim 1, wherein the Cherenkov radiation emitted undergoes a shift in wavelength, in such a way as to transfer it into a visible band, prior to its detection by a photon detector.

3. A radiographic imaging system, for restoring in real time one or several images representing an object or a patient subjected to localized radiation, comprising a particle accelerator intended to generate a beam of gamma or X photons, a detector of the particles resulting from the interaction of these photons with the irradiated object or patient, and an element for interpretation of the detection thus performed, wherein the detector detects the interaction of pass-through radiation, namely, gamma rays or X-rays, with an object to be studied, such as a patient, wherein the detector comprises:
    a converter (7) of the pass-through radiation into high energy electrons created by phenomena of pair production and the Compton effect in the process of interaction with the constituting material of the converter;
    a photon emitter by the Cherenkov effect (11) under the action of the high energy electrons originating from the converter (7), this emitter being placed right next to the converter;
    a detection element (20) sensitive to the photons created in this way and capable of reconstructing spatially the emission density of the Cherenkov photons originating from said Cherenkov emitter.

4. The system according to claim 3, wherein the converter (7) is constituted of a material with a high atomic mass number, selected from the group of materials consisting of tungsten, lead, copper, steel, and alloys of the foregoing.

5. The system according to claim 4, wherein the thickness of the converter (7) is between 0.1 and 20 millimeters.

6. The system according to claim 3, wherein the Cherenkov emitter (11) is made of an optically transparent material having a refraction index higher than 1, and selected from the group of materials consisting of calcium fluoride, sodium fluoride, lithium fluoride, magnesium fluoride, natural or synthetic silicon, silicon aerogels, water and freon, and quartz.

7. The system according to claim 6, wherein the Cherenkov (11) emitter is made of a bundle of parallel optical fibers (13) optically separated from each other, and each immersed in a fine layer of a heavy metal (14), these fibers being oriented axially-parallel to the main direction of the photons to be detected.

8. A radiographic imaging system, for restoring in real time one or several images representing an object or a patient subjected to localized radiation, comprising a particle accelerator intended to generate a beam of gamma or X photons, a detector of the particles resulting from the interaction of these photons with the irradiated object or patient, and an element for interpretation of the detection thus performed, wherein the detector is made in accordance with claim 7.

9. A system according to claim 8, wherein the system is intended to modulate the flux of gamma or X-rays so that the modulated flux only irradiates a part of the surface of the target.

10. A system according to claim 8, wherein the system is intended to measure the surface distribution of the flux of gamma or X-rays absorbed by the target.

11. The system according to claim 6, wherein the Cherenkov emitter (11) is composed of a monolayer or multilayer plate or a plate of optical fibers.

12. The system according to claim 3, wherein it additionally comprises, interposed between the Cherenkov emitter and the detection element, a layer of a material (17) intended to transmit selectively or to shift the wavelength of the Cherenkov photons which are thus emitted in a visible band.

13. The system according to claim 12, wherein the wavelength shifter (17) is made of a material selected from the group of materials consisting of sodium salicylate, p-terphenyl, diphenyloxazole (DPO), tetraphenylbutadiene (TPB), p-quaterphenyl (PQ), diphenylstilbene (DPS), trans-stilbene (TS), diphenylbutadiene (DPB), phenylene phenyloxazole (POPOP), bis(2-methylstyryl)benzene (bis-MSB), benzimidazo-benziso-quinoline (BBQ), and of a mixture of two or more of these substances.

14. The system according to one of claims 12 to 13, wherein the thickness of the layer constituting the selectively transmitting layer or the wavelength shifter (17) is within a range between 10 nanometers and 500 micrometers.

15. The system according to any one of claims 11 to 13, wherein the Cherenkov emitter is composed of a stack of several units (18) each made of a Cherenkov emitting layer coated on the exit surface with a layer (17) of a wavelength shifter.

16. A radiographic imaging system, for restoring in real time one or several images representing an object or a patient subjected to localized radiation, comprising a particle accelerator intended to generate a beam of gamma or X photons, a detector of the particles resulting from the interaction of these photons with the irradiated object or patient, and an element for interpretation of the detection thus performed, wherein the detector is made in accordance with claim 15.

17. A system according to claim 16, wherein the system is intended to modulate the flux of gamma or X-rays so that the modulated flux only irradiates a part of the surface of the target, and in that the system is intended to measure the surface distribution of the flux of gamma or X-rays absorbed by the target.

18. The system according to any one of claims 3, 4, and 6 to 13, wherein the detection module (20) is selected in the group of modules consisting of a camera with charged coupled device (CCD) with or without a system for image intensification, and a matrix of photosensitive elements, this module being optically coupled with the Cherenkov emitter or the wavelength shifter.

19. A radiographic imaging system, for restoring in real time one or several images representing an object or a patient subjected to localized radiation, comprising a particle accelerator intended to generate a beam of gamma or X photons, a detector of the particles resulting from the interaction of these photons with the irradiated object or patient, and an element for interpretation of the detection thus performed, wherein the detector is made in accordance with claim 18.

20. A system according to claim 19, wherein the system modulates the flux of gamma or X-rays so that the modulated flux only irradiates a part of the surface of the target, and measures the surface distribution of the flux of gamma or X-rays absorbed by the target.

* * * * *